(12) United States Patent
Lewis et al.

(10) Patent No.: US 11,585,261 B2
(45) Date of Patent: Feb. 21, 2023

(54) VEHICLE AIR INTAKE SCREEN MAINTENANCE SYSTEMS AND METHODS

(71) Applicant: Textron Inc., Providence, RI (US)

(72) Inventors: Linton Linn Lewis, Aiken, SC (US); Matthew Jacob Noftsger, Evans, GA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 17/333,295

(22) Filed: May 28, 2021

(65) Prior Publication Data

US 2022/0381177 A1 Dec. 1, 2022

(51) Int. Cl.
*F01P 5/04* (2006.01)
*F01P 7/04* (2006.01)

(52) U.S. Cl.
CPC ............... *F01P 5/043* (2013.01); *F01P 7/048* (2013.01)

(58) Field of Classification Search
CPC ................................. F01P 5/043; F01P 7/048
See application file for complete search history.

(56) References Cited

U.S. PATENT DOCUMENTS

| | | | | |
|---|---|---|---|---|
| 2,886,016 A * | 5/1959 | Ashton | ................... | A01D 41/12 55/288 |
| 4,160,487 A * | 7/1979 | Kunze | ................... | B60K 11/08 180/68.1 |
| 5,199,521 A * | 4/1993 | Samejima | ................ | F01P 11/12 56/6 |
| 6,750,623 B1 * | 6/2004 | McCauley | .............. | F01P 7/044 318/260 |
| 7,134,406 B1 * | 11/2006 | Loes | ......................... | F01P 7/04 123/41.11 |
| 8,967,092 B1 * | 3/2015 | Jones | ...................... | F04D 27/00 123/41.12 |
| 2003/0015361 A1 * | 1/2003 | Bland | ...................... | F01P 5/043 180/68.1 |
| 2008/0056887 A1 * | 3/2008 | Iannizzaro | .............. | F04C 2/086 417/313 |
| 2009/0120386 A1 * | 5/2009 | Kamado | .................. | F01P 5/043 60/431 |
| 2012/0304944 A1 * | 12/2012 | Nelson | .................... | F01P 5/043 165/200 |
| 2013/0008246 A1 * | 1/2013 | Nelson | .................. | G01M 99/00 417/63 |
| 2016/0311406 A1 * | 10/2016 | Deeks | .................... | B60K 11/06 |

(Continued)

*Primary Examiner* — Kurt Philip Liethen
(74) *Attorney, Agent, or Firm* — Sandberg Phoenix & von Gontard, PC

(57) ABSTRACT

A vehicle radiator air intake screen maintenance system comprising a radiator fan, a fan motor; and a control module operable to control the rotational speed and direction of the radiator fan to: periodically implement a drop cycle whereby a radiator cooling air flow generated by the fan rotating in a forward direction is slowed such debris collected on a radiator air intake screen of the vehicle is caused to fall off due to gravitational force; and periodically implement a full reverse cycle where a rotational direction of the fan is reversed and an expulsion air flow is generated whereby debris collected on vehicle radiator and the air intake screen will be blown off, whereafter reverse rotation of the fan is stopped and the fan is returned to the full forward operating speed and direction.

20 Claims, 5 Drawing Sheets

(56) References Cited

U.S. PATENT DOCUMENTS

| | | | |
|---|---|---|---|
| 2017/0002907 A1* | 1/2017 | Dionne | F04D 25/10 |
| 2017/0096931 A1* | 4/2017 | Beichner | F01P 11/12 |
| 2017/0314453 A1 | 11/2017 | West et al. | |
| 2017/0342988 A1* | 11/2017 | Marcant | F01P 7/02 |
| 2018/0328261 A1 | 11/2018 | Babbitt | |
| 2019/0184811 A1 | 6/2019 | Ivey et al. | |
| 2019/0292975 A1 | 9/2019 | Hou et al. | |
| 2020/0088087 A1 | 3/2020 | Babbitt | |
| 2021/0054776 A1* | 2/2021 | Steinmetz | F01P 7/04 |
| 2021/0394586 A1* | 12/2021 | Hara | B60H 1/3205 |

* cited by examiner

VEHICLE AIR INTAKE SCREEN MAINTENANCE SYSTEMS AND METHODS

FIELD

The present disclosure relates to systems and methods for cleaning a hood air intake screen of a turf-care vehicle to prevent blockage of airflow into the radiator of the vehicle.

BACKGROUND

The statements in this section merely provide background information related to the present disclosure and may not constitute prior art.

Commercial turf-care vehicles typically used for cutting, grooming and maintaining grass at golf courses, sporting venues, parks, etc., are generally propelled by an internal combustion engine (ICE) that is water cooled using a radiator cooling system. Additionally, such turf-care vehicles can often include hydraulic systems for driving hydraulic motors that drive rotary or reel mowers, traction systems, steering and lifting mower, that are also cooled by the radiator cooling system. As is known in the art, such radiator cooling systems typically include a coolant filled radiator fluidly connected to an engine block of the ICE and/or to the hydraulic system, and a radiator fan that is operable to draw air through the radiator to cool the coolant and hence cool the ICE and/or the hydraulic system. The ICEs, hydraulic systems and radiator cooling systems of such turf-care vehicles are typically disposed under a hood or engine housing within an engine compartment of the vehicles. The vehicle hood typically comprises one or more air intake screen disposed adjacent the radiator such that air can be drawn through the hood air intake screen(s) and through the radiator, via a cooling airflow generated by the radiator fan, in order to cool the coolant flowing through the radiator, engine block and/or hydraulic system.

Often during operation of such turf-care vehicles, debris such as dirt, dust, grass clippings, leaves, twigs, chaff, etc., (generally referred to herein as debris) gets drawn into the cooling airflow and are thereafter retained against the hood air intake screen(s) by the cooling airflow. The debris tends to collect and build-up on the hood air intake screen(s) and cause blockage or diminishment of the cooling air flow needed to dissipate heat from the ICE and/or hydraulic system, thereby decreasing the ability of the radiator to efficiently cool the engine coolant. Such a decrease in the cooling efficiency and capacity of radiator can cause the operating temperature(s) of ICE and/or hydraulic system to increase to an undesired temperature (e.g., cause the ICE and/or hydraulic system to overheat) resulting in damage to the ICE and/or hydraulic system.

At least some known turf-care vehicles include computer based controller modules that control various operations of the vehicle, including operations ICE, the hydraulic, and the cooling system. Such known vehicles program the controllers to periodically implement full reverse cycles where the rotation of the radiator fan slowed, stopped and then reversed for a period of time in order to blow, clean or clear the debris off the air intake screen(s). Thereafter, the controller slows, stops, and reverses the rotation of the radiator fan such that the fan in again rotating in an air intake/radiator cooling direction. Hence, during the debris clearing portion of full reverse cycle the radiator fan the actually blowing hot air into the radiator of the cooling system, thereby increasing the heat load in the ICE and hydraulic system.

For example, data from heat testing shows that every time the controller executed a full reverse cycle, the bulk oil temperature of the ICE and/or hydraulic system would increase 1° C. to 2° C., ultimately resulting in exceeding maximum allowed bulk oil temperatures.

SUMMARY

In various embodiments, the present disclosure provides systems and methods of controlling the radiator fan rotational speed and direction such that air intake screens are frequently cleaned or cleared so that the engine cooling fluid and/or hydraulic fluid is properly cooled, thereby preventing overheating of the bulk oil temperature of the ICE and/or hydraulic system. Particularly, the present disclosure introduces the use of debris drop cycles implemented between traditional full reverse cycles to maintain and clean the air intake screen(s) and maintain proper cooling of the engine cooling fluid and/or hydraulic system hydraulic fluid. The radiator fan (hydraulic or electric powered) is controlled by a programmable fan control module that determines the timing, rotational direction, duration, and rotational speed of the radiator fan. A drop cycle comprises controlling rotational speed and direction of the radiator fan such that the radiator fan is slowed down and/or stopped (but the rotational direction is not reversed) periodically to allow the debris to fall off the hood intake screen(s). Additionally, full reverse cycles are intermittently performed between the drop cycles. Generally, the drop cycles are performed to clear debris from the hood intake screen(s), and the full reverse cycles are performed to blow debris out of the radiator.

Empirical testing has shown the rotational direction of radiator fan does not need to be reversed and blow hot air through the radiator and intake screens for debris to fall off the intake screen(s). Rather, simply slowing the radiator fan down, in in various instances, briefly stopping the fan, to reduce the suction drawing and holding the debris on the intake screen(s) is adequate to allow the debris to fall off and clear the intake screen(s). Furthermore, testing has shown the debris on the intake screen(s) needs to be removed/cleared much more often than debris that has reached the fins of the radiator needs to be blown off/out. Occasional full reverse cycles are still needed to clean the radiator, however the systems and methods of the present disclosure perform full reverse cycles far less frequently (e.g., only a few times an hour) than known methods that perform full reverse cycles every few minutes. Hence, the systems and methods of the present disclosure maximize air flow to cooling system by reducing the frequency of full reverse cycles where the fan actually blows hot air from the engine through radiator, thereby actually adding heat to the systems. Therefore, the systems and methods of the present disclosure results in significantly more efficient cooling of the engine and/or hydraulic cooling systems.

For example, in various embodiments, the present disclosure provided a radiator air intake screen maintenance system that comprises a radiator fan of a vehicle that is operable to cool fluid flowing through a radiator of the vehicle; a fan motor operable to rotate the radiator fan; and a control module operable to control operation of the fan motor to thereby control the rotational speed and direction of the radiator fan. The operation of the fan is controlled such that periodically the fan implements a drop cycle wherein a forward radiator cooling rotation of the fan is slowed from a full forward operating speed to a drop cycle speed for a predetermined dwell time such that debris collected on a radiator air intake screen of the vehicle will fall off the radiator air intake screen due to gravitational force, and after the dwell time has elapsed the fan is returned to the full forward operating speed. Additionally, operation of the fan is controlled such that periodically the fan implements a full reverse cycle wherein the forward radiator cooling rotation of the fan is slowed from the full forward operating speed and stopped, whereafter the rotational direction of the fan is reversed and the fan is operated at a full reverse cycle speed for a predetermined reverse rotation duration time such that that debris collected on the radiator and on the air intake screen will be blown off the radiator and radiator air intake screen by an air flow generated by the fan being operated at the full reverse cycle speed, and after the reverse rotation duration time has elapsed the fan is slowed, stopped and returned to the full forward operating speed.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
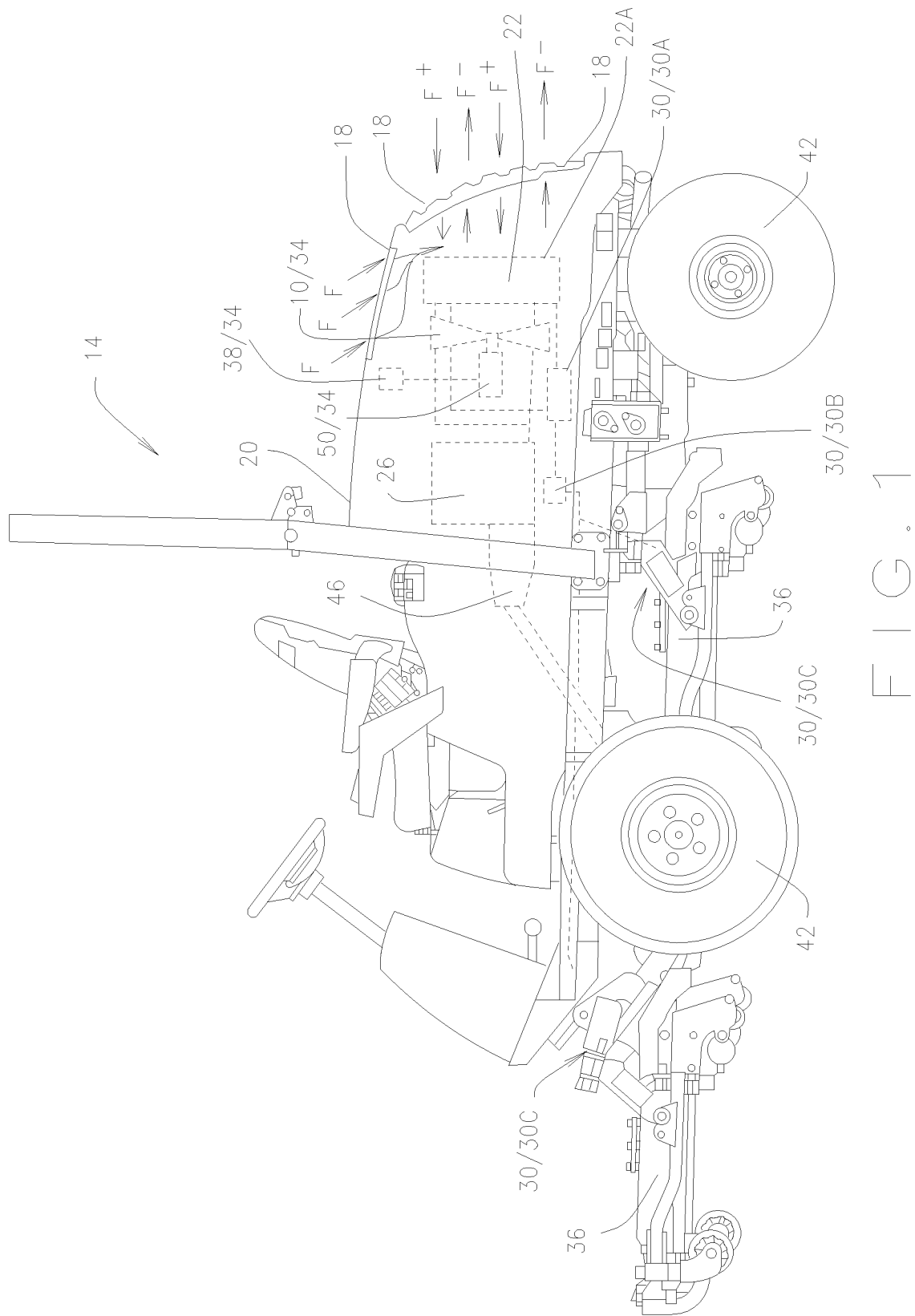
FIG. 1 is a block illustration of a turf-care vehicle including a radiator air intake screen maintenance system structured and operable for removing debris collected on a radiator air intake screen of a hood of the turf-care vehicle, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

The apparatuses/systems and methods described herein can be implemented at least in part by one or more computer program products comprising one or more non-transitory, tangible, computer-readable mediums storing computer programs with instructions that may be performed by one or more processors. The computer programs may include processor executable instructions and/or instructions that may be translated or otherwise interpreted by a processor such that the processor may perform the instructions. The computer programs can also include stored data. Non-limiting examples of the non-transitory, tangible, computer readable medium are nonvolatile memory, magnetic storage, and optical storage.

As used herein, the term module can refer to, be part of, or include an application specific integrated circuit (ASIC); an electronic circuit; a combinational logic circuit; a field programmable gate array (FPGA); a processor (shared, dedicated, or group) that performs instructions included in code, including for example, execution of executable code instructions and/or interpretation/translation of uncompiled code; other suitable hardware components that provide the described functionality; or a combination of some or all of the above, such as in a system-on-chip. The term module can include memory (shared, dedicated, or group) that stores code executed by the processor.

The term code, as used herein, can include software, firmware, and/or microcode, and can refer to one or more programs, routines, functions, classes, and/or objects. The term shared, as used herein, means that some or all code from multiple modules can be executed using a single (shared) processor. In addition, some or all code from multiple modules can be stored by a single (shared) memory. The term group, as used above, means that some or all code from a single module can be executed using a group of processors. In addition, some or all code from a single module can be stored using a group of memories.

Referring to FIG. 1, in various embodiments, the present disclosure generally provides a system and method for controlling the rotational speed and rotational direction of a radiator fan 10 of a turf mower 14 to maintain cleanliness of one or more radiator air intake screen(s) 18 disposed in a hood 20 of the mower 14. Maintaining the cleanliness of the radiator air intake screen(s) 18 (i.e., maintaining the absence of or minimalization of debris on intake screen(s) 18) allows the radiator fan to draw sufficient air through a radiator 22 of the mower 14 such that cooling fluid and/or hydraulic fluid flowing through radiator 22 is/are properly cooled, thereby preventing overheating of an internal combustion engine (ICE) 26 and/or a hydraulic system 30 of the mower 14. More particularly, the present disclosure provides a radiator air intake screen maintenance system 34 that is structured and operable to remove and/or minimalize debris such as dirt, dust, grass clippings, leaves, twigs, chaff, etc., collected on the radiator air intake screen(s) 18, and maintain the cleanliness of the radiator air intake screen(s) 18, by controlling the rotational speed and rotational direction of the radiator fan 10.

The mower 14 generally includes the ICE 26, that provides motive force to one or more wheels 42, via a mechanical, hydraulic or electric drivetrain 46. The motive force is utilized to propel the mower 14 across a ground surface, e.g., golf course greens, collars, tee-boxes, approaches, fairways, roughs, parks, other turfgrass, etc., for cutting the grass of the respective ground surface. The mower 14 additionally includes an engine and/or hydraulic system cooling system that comprises the radiator 22 fluidly connected to an engine block of the ICE 26 and/or to a hydraulic fluid tank 30A of the hydraulic system 30, and the radiator fan 10. The ICE 26, radiator 22, radiator fan 10, fan motor 50, and hydraulic system are disposed beneath and encompassed by the hood 20, and as described above, the intake screen(s) 18 is/are disposed within the hood 20 to provide portals for ambient air to be drawn into the space beneath the hood 20 and for air within the space beneath the hood to be ported to the ambient environment. The radiator fan 10 is structured and operable rotate in a forward direction to draw a cooling air flow F+ from an exterior environment (i.e., an environment exterior to the hood 20) through the radiator air intake screen(s) 18 and then through the radiator 22 to cool an engine coolant (i.e., cooling fluid) and/or a hydraulic fluid flowing through the radiator 22, thereby cooing the engine coolant and/or hydraulic fluid, and hence cooling the ICE 26 and/or hydraulic system 30. More specifically, the radiator fan 10 is controlled by a computer based control module 38, which is programmed to control the rotational speed and direction of the radiator fan 10, and thereby control the volume and flow rate of the cooling airflow F+ that is drawn in from the exterior environment. As the air flow F+ is drawn through the air intake screen(s) 18, via the radiator fan 10, debris such as dirt, dust, grass clippings, leaves, twigs, chaff, etc., can get drawn into the cooling airflow F+ and thereafter be retained against the air intake screen(s) 18 by the cooling airflow F+.

The hydraulic system 30 comprises an oil reservoir or tank 30A, that is fluidly connected to a hydraulic pump 30B, which is fluidly connected to one or more hydraulic device 30C, such as one or more hydraulic actuator that is structured and operable to raise and lower one or more mower blade deck 36, or hydraulic steering system components, or hydraulic traction systems components, etc. In various instances, the radiator fan 10 can be hydraulically operated. The pump 30B is structured and operable to pump the hydraulic fluid to the hydraulic device(s) 30C which is utilized to operate the hydraulic devices 30C. The radiator air intake screen maintenance system 34 comprises the radiator fan 10, a fan motor 50 operable to drive/rotate the fan 10 and a computer based control module 38 that is communicatively (wired or wirelessly) connected to the fan motor 50 and is structured and operable to control operation of the fan motor 50 to thereby control the rotational speed and direction of the radiator fan 10. It is envisioned that in various embodiments, the mower 14 can be absent the hydraulic system 30 whereby the one or more mower blade deck 36, steering system components, or traction systems components, etc., can be electrically operated and driven. Or, alternatively the mower 14 can comprises a hybrid hydraulic and electric system, wherein various systems, devices and components such as the one or more mower blade deck 36, steering system components, and/or traction systems components, etc., can be operated and driven by either the hydraulic system 30 and/or an electric power system.

The control module 38 can be any control module of the mower 14. For example, in various embodiments it can be a standalone module specifically programmed with one or more fan control algorithm, program code and/or software (referred to herein as fan control software) that is executable to control the rotational speed and direction of the radiator fan 10. Or, in various other embodiments, the control module 38 can be any computer based module of the mower 14 that is programmed to control the operation of various other devices and systems of the mower 14, and programmed with the fan control software to control the rotational speed and direction of the radiator fan 10. For example, in various embodiments the control module 38 can be an engine control module (ECM) and/or a master control unit (MCU) of the mower 14 that is/are programmed, independently or in combination, to control various functions and operations of the ICE 26, and is also programmed with the fan control software to control the rotational speed and direction of the radiator fan 10. In various other embodiments, it is envisioned that the control module 38 can be a hardware based module that is structured and operable to implement the fan control software functionality as described herein. For example, it is envisioned that the control module 38 can comprise one or more, or be part of, application specific integrated circuit(s) (e.g., ASIC(s)), combinational logic circuit(s); field programmable gate array(s) (FPGA); processor(s) (shared, dedicated, or group) that execute the fan control software; and/or other suitable hardware components that provide the functionality described herein; or a combination of some or all of the above, such as in a system-on-chip, and remain within the scope of the present disclosure.

It should be understood that although the control module 38 is sometimes described herein as directly controlling the various automated, or robotic, operations of the radiator fan 10, it is the execution of the fan control software by at least one processor of the control module 38, in various instances using inputs from a user interface, various electronically stored data tables, databases, lookup tables, etc., and/or various other components, sensors, systems and assemblies of the mower 14 that actually control the various automated, or robotic, operations of the radiator fan 10 described herein. Additionally, in various instances the control module 38 may indirectly perform and/or control performance of such operations and functionality of the radiator fan 10 by generating commands and control signals that can cause other elements to carry out the control operations and functionality of the radiator fan described herein. Or, in the various hardware embodiments, it is the operation of the various control module 38 hardware components that can generate the fan control commands that are then output by the control module 38 to control the operations and functions of the radiator fan as described herein.

In various embodiments, the radiator 22 can be a split radiator with the hydraulic fluid flowing through a hydraulic fluid (e.g., oil) cooler section of the radiator 22 (e.g., a first half of the radiator 22) and the engine coolant flowing through a coolant cooler section (e.g., a second half of the radiator 22). In such instances, the hydraulic fluid and coolant cooler sections are completely sealed from one another to prevent fluid intermixing. In such embodiments, the hydraulic fluid enters the hydraulic fluid cooler section of the radiator 22 (e.g., enters from the top or bottom of hydraulic fluid cooler section of the radiator 22) and is directly cooled by the forced air flow F+ generated by the radiator fan 10 that is drawn over the fins of the radiator 22. As the air flow F+ passes through the radiator 22, heat from the hot hydraulic fluid flowing through the radiator 22 is rejected to or absorbed by the air flow F+, thereby cooling the oil before it exits the hydraulic fluid cooler section of the radiator 22 is returned to a hydraulic tank 30A. Similarly, the engine coolant from an engine block of the ICE 26 enters the coolant cooler section of the radiator 22 and is directly cooled by the forced air flow F+ generated by the radiator fan 10 that is drawn over the fins of the radiator 22. As the air flow F+ passes through the radiator 22, heat from the hot engine coolant flowing through the radiator 22 is rejected to or absorbed by the air flow F+, thereby cooling the engine coolant before it exits the coolant cooler section of the radiator 22 and is returned to the engine block of the ICE 26. Hence, the hydraulic fluid and engine coolant sections are separate closed loop systems that only extracts heat from the respective hydraulic fluid and engine coolant and each section plays no part in cooling the opposing hydraulic fluid and engine coolant flowing through the other section.

In various embodiments, the radiator 22 can be structured to cool only one of the engine coolant or the hydraulic fluid. For example, in embodiments wherein the mower 14 does not include the hydraulic system 30, the radiator 22 can be structure and operable only to cool the engine coolant. Or, it is envisioned that in various embodiments, the mower 14 can be configured to include a first radiator 22 and fan 10 combination for cooling the hydraulic fluid, and a second and independent radiator 22 and fan 10 combination for cooling the engine coolant. In such embodiments, the mower 14 can include one or more control module 38 structured an operable to control the rotational speed and direction of the first and or second fans 10. For convenience and simplicity, the mower 14 will be described herein to comprise the single split radiator 22 structured to comprise the hydraulic fluid cooler section and the engine coolant cooler section as described above. Importantly, regardless of number and/or configuration of the radiator 22, the radiator air intake screen maintenance system 34 comprising the respective radiator fan(s) 10 and control module(s) 38, will function and be operable as described herein. Additionally, although the radiator air intake screen maintenance system 34 is described herein as being implemented in the turf mower 14, it should be understood that the radiator air intake screen maintenance system 34 described herein can be implemented in any vehicle having a radiator and radiator air intake screen, wherein the radiator air intake screen is prone to collecting debris (e.g., dirt, dust, grass clippings, leaves, twigs, chaff, etc.) during operation of the respective vehicle, and remain within the scope of the present disclosure.

Figure 3:
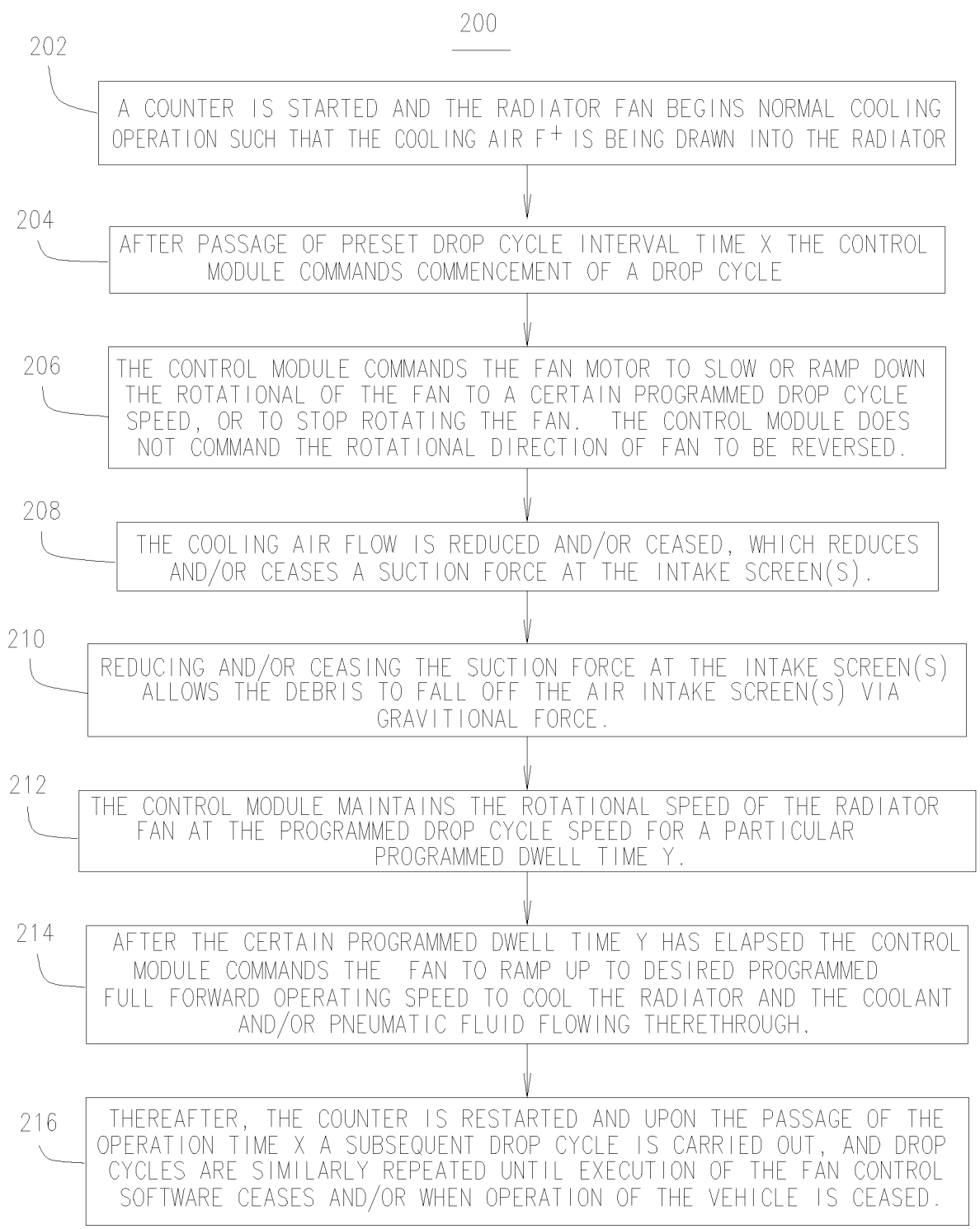
FIG. 3 is a flow chart that exemplarily illustrates the steps of a drop cycle executed by a control module of the radiator air intake screen maintenance system shown in FIGS. 1 and 2, in accordance with various embodiments of the present disclosure.
Figure 4:
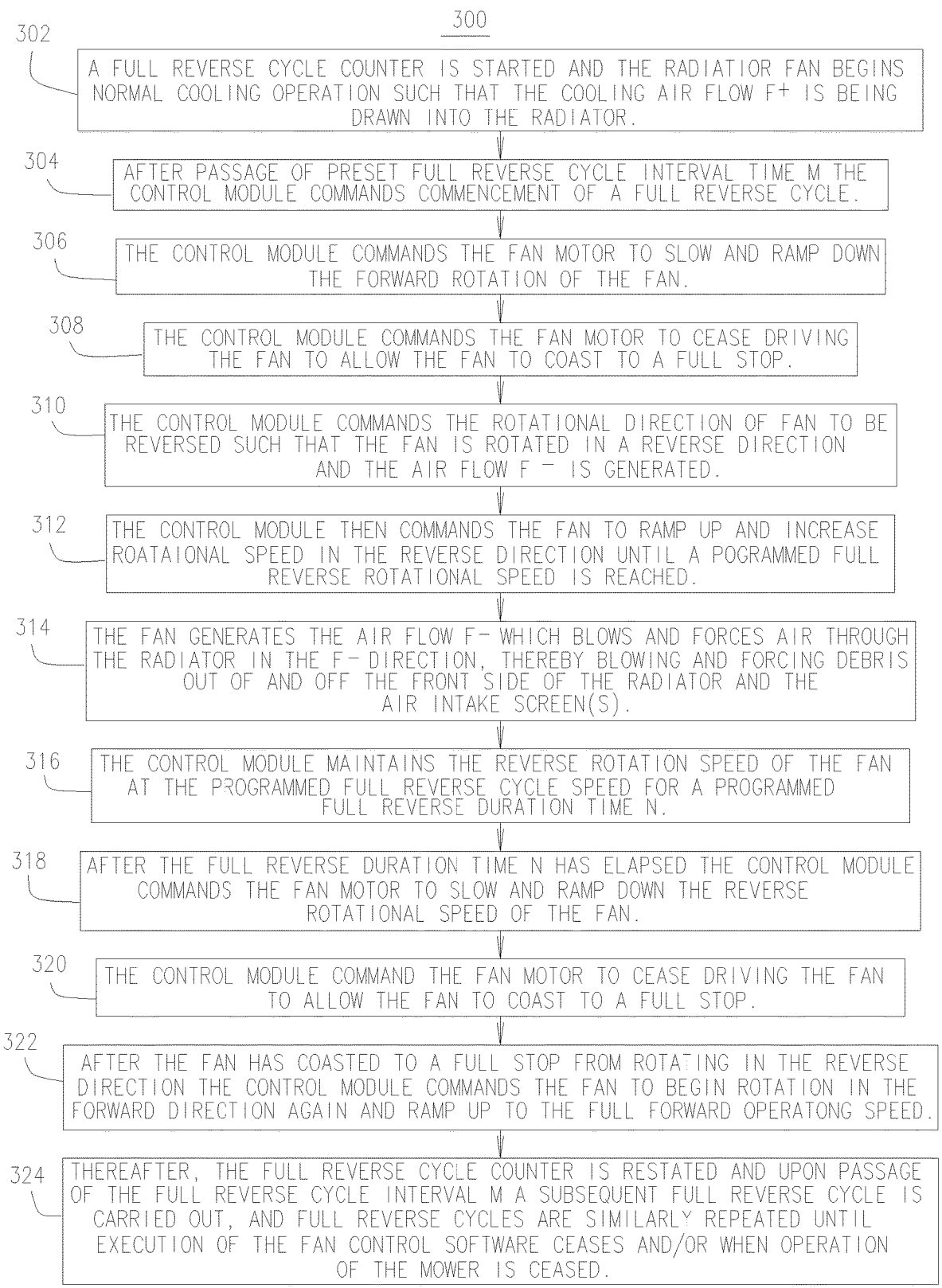
FIG. 4 is a flow chart that exemplarily illustrates the steps of a full reverse cycle executed by the control module of the radiator air intake screen maintenance system shown in FIGS. 1 and 2, in accordance with various embodiments of the present disclosure.

Referring now to FIGS. 3 and 4, as described above the radiator air intake screen maintenance system 34 comprises the radiator fan 10, the fan motor 50 and the programmable computer based control module 38. The control module 38 is communicatively (wired or wirelessly) connected the fan motor 50 and is structured and operable to execute the fan control software in order to control the rotational speed and direction of the radiator fan 22. For example, in various embodiments, the control module 38 is programmable with the fan control software that is executable to implement an intake screen clearing routine that includes a predetermined sequence of debris drop cycles to maintain and clean the air intake screen(s) and maintain proper cooling of the engine cooling fluid and/or hydraulic system hydraulic fluid. More specifically, execution of the fan control software by the control module 38 controls the rotational speed and direction of the radiator fan 10 in accordance with a predetermined sequence of debris drop cycle fan operation parameters that comprise the timing, rotational direction, duration, and rotational speed of the radiator fan 10. Alternatively, in various embodiments, the control module 38 is programmable with the fan control software that is executable to implement an intake screen clearing routine that includes a predetermined sequence of debris drop cycles and full reverse cycles to maintain and clean the air intake screen(s) and maintain proper cooling of the engine cooling fluid and/or hydraulic system hydraulic fluid. More specifically, execution of the fan control software by the control module 38 controls the rotational speed and direction of the radiator fan 10 in accordance with a predetermined sequence of debris drop cycle fan operation parameters and full reverse cycle fan operation parameters. The debris drop cycle fan operation parameters and full reverse cycle fan operation parameters each comprise the timing, rotational direction, duration, and rotational speed of the radiator fan 10.

Although, the control module 38 can be programmable with the fan control software to implement an intake screen clearing routine that includes a predetermined sequence of only debris drop cycles, in the exemplary embodiments described below the control module 38 will be described as being programmable with the fan control software designed to implement an intake screen clearing routine that includes a predetermined sequence of both debris drop cycles and full reverse cycles.

Figure 2:
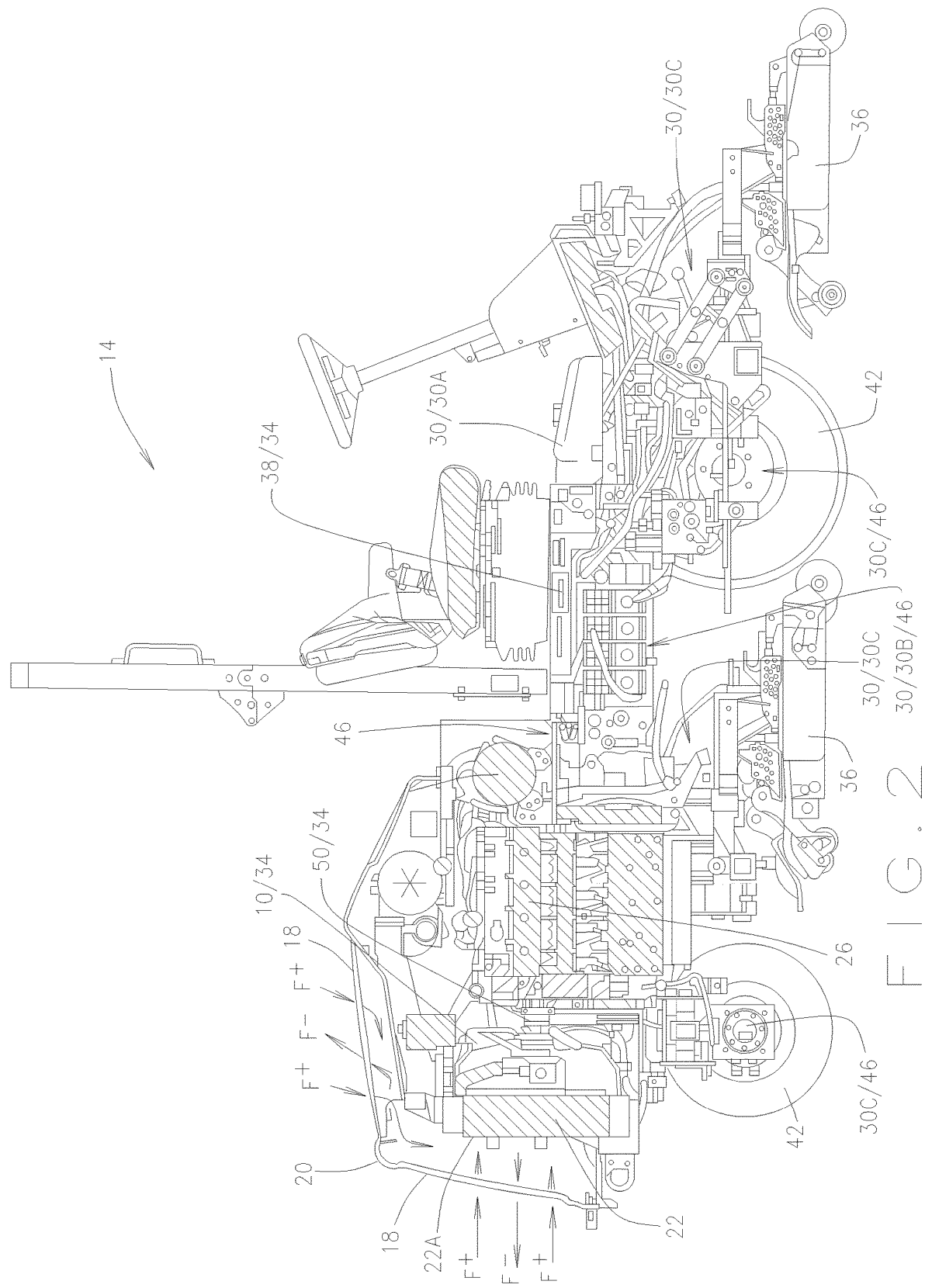
FIG. 2 is cross-sectional view of turf-care vehicle, such as that shown in FIG. 1, including the radiator air intake screen maintenance system shown in FIG. 1, in accordance with various embodiments of the present disclosure.

FIG. 3 provides a flow chart 200 that exemplarily illustrates the steps of a drop cycle commanded by the control module 38. Generally, a drop cycle, as controlled by the control module 38, comprises controlling rotational speed and direction of the radiator fan 10 such that the radiator fan 10 is slowed down and/or stopped (but the rotational direction is not reversed) to allow debris collected on the intake screen(s) 18 to fall off. Particularly, initially when the operation of the mower 14 is initiated, execution of the fan control software by the control module 38 starts a drop cycle counter and the radiator fan 10 is commanded to turn in the forward or radiator cooling direction, ramp up to full forward operating speed, and begin normal cooling operation where the fan 10 rotates in the forward direction and generates the cooling air flow F+ drawn into the radiator 22 (as shown in FIGS. 1 and 2), as indicated at 202. Full forward operating speed is a predetermined programed rotational speed (e.g., predetermined programed RPM) of the radiator fan 10 that is predetermined to provide maximum cooling of the radiator 22. Thereafter, via execution of the fan control software, when the drop cycle counter hits a preset passage of time X, referred to herein as drop cycle interval X (e.g., 2 to 15 minutes or longer), the control module 38 commands commencement of a drop cycle, as indicated at 204. Upon commencement of the drop cycle the control module 38 commands the fan motor 50 to slow, or ramp down, the rotational speed of the radiator fan 10 to a certain programmed drop cycle speed or commands the fan motor 50 to stop rotation of the fan 10, as indicated a 206. Particularly, the control module 38 does not command the rotational direction of fan 10 to be reversed such that the fan 10 is rotating in a backward or reverse direction (i.e., rotating in non-cooling direction such that an expulsion air flow F– is generated that is opposite of the cooling air flow F+). This in turn reduces and/or ceases the cooling air flow F+, which in turn reduces and/or ceases a suction force present at the intake screen(s) 18 that is generated by the cooling air flow F+ being drawn through the air intake screen(s) 18, as indicated at 208. Reducing and/or ceasing the suction force at the intake screen(s) 18 allows the debris to fall off the air intake screen(s) 18 via gravitational force as indicated at 210. In various instances, the ambient environment wind or breeze can aid the gravitational force to remove the debris from the intake screen(s) 18. The control module 38 maintains the rotational speed of the radiator fan 10 at the programmed drop cycle speed for a particular programmed duration of time Y referred to herein as dwell time Y (e.g., 2.0 to 10.0 seconds), as indicated at 212. Subsequently, after the dwell time Y has elapsed the control module 38 commands the radiator fan 10 to begin or increase (e.g., ramp up) rotation of the fan 10 in the forward or cooling direction until the rotational speed of the fan 10 is at the desired programmed full forward operating speed for proper cooling of the radiator 22 and the coolant and/or pneumatic fluid flowing therethrough, as indicated at 214. Thereafter, the drop cycle counter is restarted and upon the passage of the drop cycle interval X (e.g., 2 to 15 minutes or longer) a subsequent drop cycle is carried out, and drop cycles are similarly repeated until execution of the fan control software ceases and/or when operation of the mower is ceased, as indicated at 216.

It is envisioned that execution of each drop cycle would only take a few seconds. Therefore, the radiator fan 10 would only cease generating the cooling air flow F+ for short periods and will not cause the engine coolant and/or hydraulic fluid temperature to increase or only increase minimally compared to the temperature increase caused by full reverse cycles. For example, in various embodiments, the ramp down portion of the drop cycle indicated at 204 and 206 can take 1.0 to 3.0 seconds (e.g., 2.15 seconds), the dwell time portion of drop cycle indicated at 208, 210 and 212 can take 2.0 to 6.0 seconds or longer (e.g., 3.0 seconds), and the ramp up portion of the drop cycle indicated at 214 can take 1.0 to 4.0 seconds (e.g., 2.15 seconds). Hence, in an exemplary embodiment, an entire drop cycle, can take only 4.0 to 13.0 second (e.g., 7.3 seconds). That is, in an exemplary embodiment, the duration of a drop cycle, i.e., the time elapsed between commanding the radiator fan 10 to cease operating/rotating in the forward direction to generate the cooling air flow F+ for cooling the engine coolant and/or hydraulic fluid and the fan 10 speed is ramped back up to full forward operating speed, is only 4.0 to 13.0 second (e.g., 7.3 seconds). As described above, in various embodiments, the drop cycle interval X (i.e., time between drop cycles) can be between 2 to 10 minutes or longer. For example, in various instances the drop cycle interval X can be 5 minutes.

Full reverse cycles are performed at certain programed intervals, referred to herein as a full reverse cycle interval M, between and intermixed with the drop cycles. For example, in various embodiments the full reverse cycle interval M can be 10 to 90 minutes (e.g., 30 minutes). The full reverse cycles are included in the fan control software routines such that the full reverse cycles are intermixed with the drop cycles during execution of the fan control software by the control module 38. Generally, the drop cycles are performed frequently and are performed to clear debris from the hood intake screen(s) 18, while the full reverse cycles are performed much less frequently than the drop cycles and are performed to blow debris out of the radiator 22.

FIG. 4 provides a flow chart 300 that exemplarily illustrates the steps of a full reverse cycle commanded by the control module 38. Generally, a full reverse cycle, as controlled by the control module 38, comprises controlling rotational speed and direction of the radiator fan 10 such that the radiator fan 10, when rotating in the forward direction at full forward operating speed, is slowed down and stopped, the direction of rotation is reversed and increased to a full reverse cycle or expulsion speed such that debris collected on a front side 22A of the radiator 22 (i.e., the side of the radiator opposite the side on which the fan 10 is disposed), and debris caught within the cooling fins of the radiator 22, and debris collected on the intake screen(s) 18 is blown or forced off and out of the radiator 22 and the intake screen(s) 18 by the expulsion air flow F− generated by the fan 10. Particularly, initially when the operation of the mower 14 is initiated, execution of the fan control software by the control module 38 starts a full reverse cycle counter and the radiator fan 10 is commanded to turn in the forward or radiator cooling direction, ramp up to full forward operating speed, and begin normal cooling operation where the fan 10 rotates in the forward direction and generates the cooling air flow F+ drawn into the radiator 22 (as shown in FIGS. 1 and 2), as indicated at 302. Thereafter, via execution of the fan control software, when the counter hits a preset passage of time M, referred to herein as full reverse cycle interval M (e.g., 10 to 90 minutes, for example 30 minutes), the control module 38 commands commencement of a full reverse cycle, as indicated at 304. Upon commencement of the full reverse cycle the control module 38 commands the fan motor 50 to slow and ramp down the forward rotational speed of the radiator fan 10, as indicated at 306. The control module 38 then commands the fan motor 50 to cease driving the fan 10 to allow the fan 10 to coast to a full stop, as indicated at 308.

Thereafter, the control module 38 commands the rotational direction of fan 10 to be reversed such that the fan 10 is rotated in a backward or reverse direction and the expulsion air flow F− is generated, as indicated at 310. The control module 38 then commands the fan 10 to ramp up and increase rotational speed in the reverse direction until the programed full reverse cycle or expulsion speed, is reached, as indicated at 312. In the reverse direction the fan 10 generates the expulsion air flow F− which blows and forces air through the radiator 22 in the F− direction. The forced or blown expulsion air flow F− blows and forced forces debris off the front side 22A and out of the radiator fins of the radiator 22 and off and out of the air intake screen(s) 18, as indicated at 314. The control module 38 maintains the reverse rotational speed of the fan 10 at the programmed full reverse cycle speed for a particular programmed duration of time N referred to herein as full reverse duration time N (e.g., 5.0 to 20.0 seconds), as indicated at 316. After the full reverse duration time N has elapsed the control module 38 commands the fan motor 50 to slow and ramp down the reverse rotational speed of the radiator fan 10, as indicated a 318. The control module 38 then commands the fan motor 50 to cease driving the fan 10 to allow the fan 10 to coast to a full stop, as indicated a 320. After the fan 10 has coasted to a full stop from rotating in the reverse direction the control module 38 commands the fan 10 to begin rotation in the forward direction again and increase or ramp up to the programed full forward operating speed for proper cooling of the radiator 22 and the coolant and/or pneumatic fluid flowing therethrough, as indicated at 322. Thereafter, the full reverse cycle counter is restarted and upon the passage of the full reverse cycle interval M (e.g., 10 to 90 minutes or longer) a subsequent full reverse cycle is carried out, and full reverse cycles are similarly repeated until execution of the fan control software ceases and/or when operation of the mower 14 is ceased, as indicated at 324.

Each full reverse cycle would take a several seconds. For example, in various embodiments, the ramp down portion of the full reverse cycle indicated at 304 and 306 can take 2.0 to 5.0 seconds (e.g., 3.4 seconds), the coast to full stop portion indicated at 308 can take 1.0 to 2.0 seconds (e.g., 1.0 second), the ramp up to full reverse speed indicated at 310 and 312 can take 2.0 to 5.0 seconds (e.g., 3.4 seconds), the full reverse duration time during which the expulsion air flow F− blows and forces debris off of and out of the radiator and the air intake screen(s) 18 indicated at 314 and 316 can take 5.0 to 15.0 seconds (e.g., 10.0 seconds), the ramp down from full reverse speed indicated at 318 can take 2.0 to 5.0 seconds (e.g., 3.4 seconds), the coast to full stop portion indicated at 320 can take 1.0 to 2.0 seconds (e.g., 1.0 second), and reverse the direction of rotation of the fan 10 back to the forward rotations direction and ramp the rotation speed back up to full forward operating speed can take 2.0 to 5.0 seconds (e.g., 3.4 seconds). Hence, in an exemplary embodiment, an entire full reverse cycle can take 15.0 to 40.0 seconds (e.g., 25.6 seconds). That is, in an exemplary embodiment, the duration of a full reverse cycle, i.e., the time elapsed from commanding the radiator fan 10 to cease operating/rotating in the forward direction to generate the cooling air flow F+ for cooling the engine coolant and/or hydraulic fluid, to the fan 10 rotational direction is reversed and ramped up to full reverse speed for the reverse duration time N, to the fan rotation direction is reversed again and ramped back up to full forward operating speed, can consume 15.0 to 40.0 seconds (e.g., 25.6 seconds). As described above, in various embodiments, the full reverse cycle interval M (i.e., time between full reverse cycles) can be between 10 and 90 minutes or longer. For example, in various instances the full reverse cycle interval M can be 30 minutes.

Figure 5:
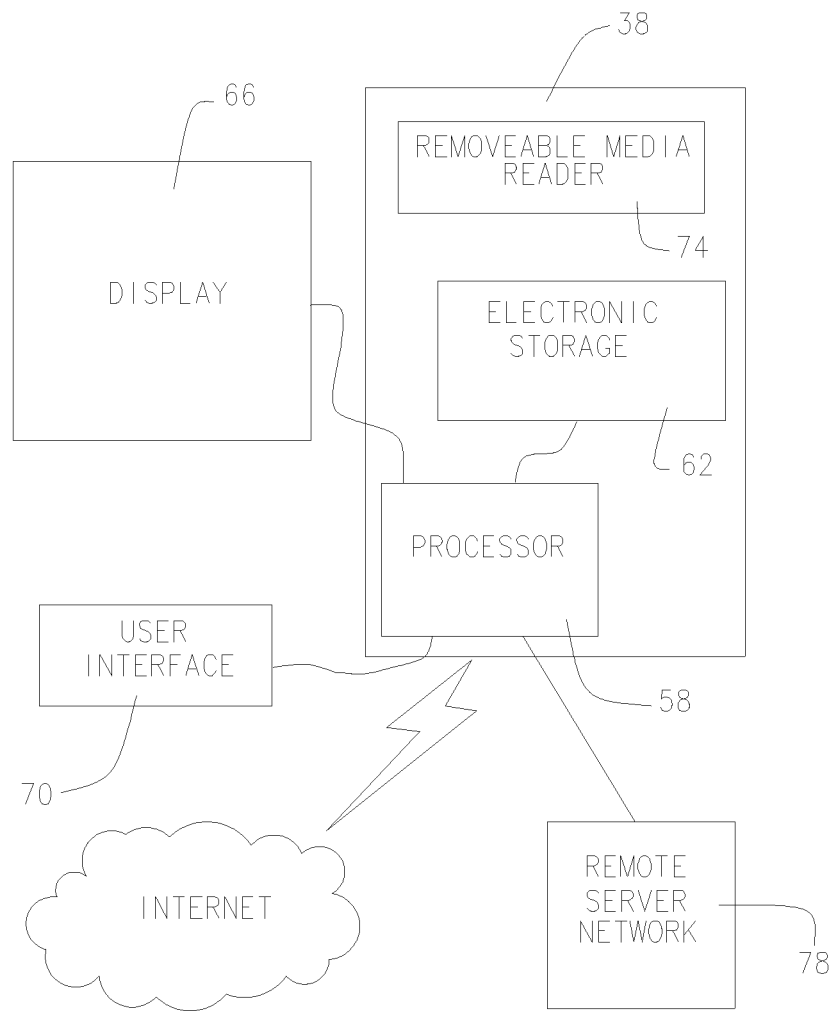
FIG. 5 is a block diagram of the control module of the radiator air intake screen maintenance system shown in FIGS. 1 and 2, in accordance with various embodiments of the present disclosure.

Referring to FIG. 5, as described above, in various embodiments, the control module 38 can be a computer based module that is a standalone module or any control module of the mower 14 that is programmed with one or more fan control algorithm, program code and/or software that is executable to control the rotational speed and direction of the radiator fan 10, and in various instances can be additionally programmed to control other mower 14 operations. In such exemplary embodiments, the control module 38 generally comprises at least one processor 58 suitable to execute the fan control software as described herein and at least one electronic storage device 62 on which the fan control software is stored. The electronic storage device(s) 62 comprises a computer readable medium, e.g., non-transitory, tangible, computer-readable medium, such as a hard drive, erasable programmable read-only memory (EPROM), electronically erasable programmable read-only memory (EEPROM), read-write memory (RWM), etc. Other, non-limiting examples of the non-transitory, tangible, computer-readable medium are nonvolatile memory, magnetic storage, and optical storage. Generally, the computer readable memory can be any electronic data storage device for storing such things as the various software, programs, algorithms, code, digital information, data, look-up tables, spreadsheets and/or databases, etc., used and executed during operation of the mower 14, the radiator air intake screen maintenance system 34, as described herein.

Additionally, in various instances of such exemplary embodiments the control module 38 can be connectable (wired or wirelessly) to a display 66 for displaying such things as information, data and/or graphical representations, and/or at least one user interface device 70, such as a keyboard, mouse, stylus, and/or an interactive touch-screen on the display 66 for inputting data and information such as drop cycle and full reverse cycle parameters and settings such as the timing and duration of the various steps of the drop cycle and full reverse cycle, and the drop cycle and full reverse cycle intervals X and M, described above. Furthermore, it is envisioned that in various embodiments the control module 38 can include a removable media reader 74 for reading information and data from and/or writing information and data to removable electronic storage media such as flash drives or any other computer readable removable and portable electronic storage media. Still further, it is envisioned that in various embodiments the control module 38 can be communicatively connectable (wired or wirelessly) to a remote server network 78, e.g., a local area network (LAN), via a wired or wireless link such that control module 38 can communicate with the remote server network 78 to upload and/or download data, information, algorithms, software programs, etc. Still further yet, it is envisioned that in various embodiments the control module 38 can be structured and operable to access the Internet to upload and/or download data, information, algorithms, software programs, etc., to and from Internet sites and network servers.

In various embodiments, it is envisioned that the fan control software and the drop cycle and full reverse cycle parameters and settings such as the timing a duration of the various steps of the drop cycle and full reverse cycle described above can be hard coded into the control module 38 (e.g., into the electronic storage 62) by the software vendor such that the drop cycle and full reverse cycle parameters and settings cannot be modified by the mower manufacturer, the mower dealer or the mower end user. However, in various alternative embodiments, it is envisioned that the one or more of the drop cycle and/or full reverse cycle parameters and settings such as the timing a duration of the various steps of the drop cycle and full reverse cycle described above can be modified, via use of the display 66, user interface 70 removable media reader 74, remote server network 78 and/or Internet, by one or more of the mower manufacturer, the mower dealer and/or the mower end user.

Furthermore, it is envisioned that in various embodiments, the radiator air intake screen maintenance system 34 can comprise one or more sensor, such as engine oil temperature sensor, hydraulic fluid temperature sensor, ambient environment temperature, ambient environment humidity sensor, etc., that is/are communicatively connected (wired or wirelessly) to the control module 38, and the fan control software comprises one or more automated drop and/or full reverse cycle parameter adjustment routine. In such embodiments, via execution of the fan control software, the control module 38 monitors inputs/reading from one or more of the sensors and can automatically adjust the drop and/or full reverse cycle parameters based on such inputs.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A radiator air intake screen maintenance system, said system comprising:
    a radiator fan of a vehicle, the radiator fan structured and operable to cool fluid flowing through a radiator of the vehicle;
    a fan motor structured and operable to rotate the radiator fan; and
    a computer based control module communicatively connected to the fan motor and is structured and operable to control operation of the fan motor to thereby control the rotational speed and direction of the radiator fan such that at predetermined drop cycle intervals the fan is operated to implement a drop cycle wherein when implementing the drop cycle a forward radiator cooling rotation of the fan is slowed from a full forward operating speed to a drop cycle speed for a predetermined dwell time such that debris collected on a radiator air intake screen of the vehicle will fall off the radiator air intake screen due to gravitational force, then absent control of the fan to reverse rotation of the fan and after the dwell time has elapsed the fan is returned to the full forward operating speed, wherein dwell time is a component of the predetermined drop cycle intervals.

2. The system of claim 1, wherein the control module is further structured and operable to control operation of the fan motor to thereby control the rotational speed and direction of the radiator fan such that periodically the fan is operated to implement a full reverse cycle wherein when implementing the full reverse cycle the forward radiator cooling rotation of the fan is slowed from the full forward operating speed and stopped, whereafter the rotational direction of the fan is reversed and the fan is operated at a full reverse cycle speed for a predetermined reverse rotation duration time such that that debris collected on the radiator and on the air intake screen will be blown off and out of the radiator and the radiator air intake screen by an expulsion air flow generated by the fan being operated at the full reverse cycle speed, then after the reverse rotation duration time has elapsed the fan is slowed, stopped and returned to the full forward operating speed.

3. The system of claim 2, wherein the computer based module controls operation of the fan motor such that the periodic drop cycles are implemented at the predetermined drop cycle intervals and the full reverse cycles are implemented at a predetermined full reverse cycle intervals.

4. The system of claim 3, wherein at least one of:
    the drop cycle interval is between 2 minutes and 15 minutes; and
    the full reverse cycle interval is between 1 minute and 90 minutes.

5. The system of claim 2, wherein a duration of each drop cycle is less than the duration of each full reverse cycle.

6. The system of claim 5, wherein at least one of:
    the duration of the drop cycle is between 4.0 seconds and 13.0 seconds; and the duration of the full reverse cycle is between 15.0 seconds and 40.0 seconds.

7. A vehicle, said vehicle comprising:
a plurality of wheels;
a drivetrain operatively connected to the at least one of the wheels;
an internal combustion engine operatively connected to the drivetrain and structured and operable to provide motive force to the at least one wheel, via the drivetrain;
a cooling system structured and operable to cool the internal combustion engine, the cooling system comprising a radiator;
a hood disposed over the internal combustion engine and the cooling system, the hood having a radiator air intake screen disposed therein; and
a radiator air intake screen maintenance system, the radiator air intake screen system comprising:
   a radiator fan of the vehicle, the radiator fan structured and operable to cool fluid flowing through the radiator;
   a fan motor structured and operable to rotate the radiator fan; and
   a computer based control module communicatively connected to the fan motor and structured and operable to control operation of the fan motor to thereby control the rotational speed and direction of the radiator fan such that at predetermined intervals the fan is operated to implement a drop cycle wherein when implementing the drop cycle a forward radiator cooling rotation of the fan is slowed from a full forward operating speed to a drop cycle speed for a predetermined dwell time such that debris collected on the radiator air intake screen will fall off the radiator air intake screen due to gravitational force, then absent control of the fan to reverse rotation of the fan and after the dwell time has elapsed the fan is returned to the full forward operating speed.

8. The vehicle of claim 7, wherein the control module is further structured and operable to control operation of the fan motor to thereby control the rotational speed and direction of the radiator fan such that periodically the fan is operated to implement a full reverse cycle wherein the forward radiator cooling rotation of the fan is slowed from the full forward operating speed and stopped, whereafter the rotational direction of the fan is reversed and the fan is operated at a full reverse cycle speed for a predetermined reverse rotation duration time that such that debris collected on the radiator and on the air intake screen will be blown off and out of the radiator and the radiator air intake screen by an expulsion air flow generated by the fan being operated at the full reverse cycle speed, and after the reverse rotation duration time has elapsed the fan is slowed, stopped and returned to the full forward operating speed.

9. The vehicle of claim 8, wherein the computer based module controls operation of the fan motor such that the periodic drop cycles are implemented at the predetermined drop cycle intervals and the full reverse cycles are implemented at predetermined full reverse cycle intervals.

10. The vehicle of claim 9, wherein at least one of:
the drop cycle intervals are between 2 minutes and 15 minutes; and
the full reverse cycle intervals are between 10 minutes and 90 minutes.

11. The vehicle of claim 8, wherein a duration of each drop cycle is less than the duration of each full reverse cycle.

12. The vehicle of claim 11, wherein at least one of:
the duration of the drop cycle is between 4.0 seconds and 13.0 seconds; and
the duration of the full reverse cycle is between 15.0 seconds and 40.0 seconds.

13. The vehicle of claim 7 further comprising a hydraulic system disposed under the hood and cooled by cooling system.

14. The vehicle of claim 7, wherein the vehicle is turf mower.

15. A method for maintaining the cleanliness of a radiator air intake screen disposed in a hood of vehicle to minimalization collection of debris on the radiator intake screen and thereby allow a radiator fan of the vehicle to draw sufficient air through a radiator of the vehicle to cool fluid flowing through the radiator and provide proper cooling of an internal combustion engine of the vehicle, the vehicle including a radiator air intake screen maintenance system comprising:
the radiator fan;
a fan motor structured and operable to rotate the radiator fan; and
a computer based control module communicatively connected to the fan motor and is structured and operable to control operation of the fan motor to thereby control the rotational speed and direction of the radiator fan, said method comprising:
at predetermined intervals implementing, via the control module, a drop cycle, wherein implementing a drop cycle comprises:
   slowing a forward radiator cooling rotation of the fan from a full forward operating speed to a drop cycle speed;
   maintaining rotation of the fan at the drop cycle speed for a predetermined dwell time such that debris collected on the radiator air intake screen will fall off the radiator air intake screen due to gravitational force; and
   absent reversing rotation of the fan, after the dwell time has elapsed returning the fan to the full forward operating speed.

16. The method of claim 15 further comprising periodically implementing, via the control module, a full reverse cycle, wherein implementing a full reverse cycle comprises:
slowing the forward radiator cooling rotation of the fan from the full forward operating speed;
stopping the forward radiator cooling rotation of the fan;
reversing the direction of rotation of the fan;
increasing the reversed direction rotation of the fan to a full reverse cycle speed;
maintaining the rotation of the fan at the full reverse cycle speed for a predetermined reverse rotation duration time such that that debris collected on the radiator and on the air intake screen will be blown off and out of the radiator and the radiator air intake screen by an expulsion air flow generated by the fan being operated at the full reverse cycle speed; and
after the reverse rotation duration time has elapsed, slowing and stopping the reverse rotation of the fan, returning the direction of rotation of the fan to the forward radiator cooling direction, and returning the fan to the full forward operating speed.

17. The method of claim 16, wherein the periodic drop cycles are implemented at the predetermined drop cycle intervals and the full reverse cycles are implemented at predetermined full reverse cycle intervals.

18. The method of claim 17, wherein at least one of:
the drop cycle intervals are between 2 minutes and 15 minutes; and
the full reverse cycle intervals are between 10 minutes and 90 minutes.

19. The method of claim 16, wherein a duration of each drop cycle is less than the duration of each full reverse cycle.

20. The method of claim 19, wherein at least one of:
the duration of the drop cycle is between 4.0 seconds and 13.0 seconds; and
the duration of the full reverse cycle is between 15.0 seconds and 40.0 seconds.

\* \* \* \* \*